United States Patent
Franke et al.

(10) Patent No.: US 6,216,061 B1
(45) Date of Patent: Apr. 10, 2001

(54) METHOD FOR DETERMINING A REFERENCE MAGNITUDE

(75) Inventors: Torsten Franke; Klaus Gläbe, both of Hannover; Ralf Koschorek, Ronnenberg; Thomas Reich, Hannover, all of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/293,440

(22) Filed: Apr. 16, 1999

(30) Foreign Application Priority Data

Apr. 21, 1998 (DE) ............................................ 198 17 686

(51) Int. Cl.$^7$ ...................................................... G01P 3/00
(52) U.S. Cl. .................................. 701/1; 701/72
(58) Field of Search .................. 701/1, 72, 82; 303/140, 146

(56) References Cited

U.S. PATENT DOCUMENTS

| 5,082,333 | | 1/1992 | Fukushima et al. ............ 303/96 |
| 5,312,169 | * | 5/1994 | Buschmann ..................... 303/140 |
| 5,436,831 | * | 7/1995 | Erhardt et al. ................. 701/1 |
| 5,686,662 | * | 11/1997 | Tracht et al. .................... 73/121 |
| 5,774,821 | | 6/1998 | Eckert ............................. 701/78 |

FOREIGN PATENT DOCUMENTS

| 41 23 232 A1 | 1/1993 | (DE) . |
| 42 16 301 A1 | 11/1993 | (DE) . |
| 43 24 511 A1 | 1/1994 | (DE) . |
| 42 26 749 A1 | 2/1994 | (DE) . |
| 42 28 414 A1 | 3/1994 | (DE) . |
| 42 28 893 A1 | 3/1994 | (DE) . |
| 42 29 504 A1 | 3/1994 | (DE) . |
| 4016668 | 11/1994 | (DE) . |
| 43 14 827 A1 | 11/1994 | (DE) . |
| 43 25 413 C2 | 5/1995 | (DE) . |
| 195 15 051 A1 | 5/1996 | (DE) . |
| 19515051 | 5/1996 | (DE) . |
| 195 02 858 C1 | 7/1996 | (DE) . |
| 196 29 275 A1 | 4/1997 | (DE) . |
| 196 49 137 A1 | 6/1997 | (DE) . |
| 196 02 994 A1 | 7/1997 | (DE) . |
| 196 07 050 A1 | 8/1997 | (DE) . |

(List continued on next page.)

OTHER PUBLICATIONS

Alberti, Volker, et al. "Fahrstabilitätsregelung durch Aktivbremsung einzelner Räder," *Automatisierungstechnik*, vol. 44, 1996, 5, pp. 213–218.

*Primary Examiner*—Michael J. Zanelli
(74) *Attorney, Agent, or Firm*—Proskauer Rose LLP

(57) ABSTRACT

A method for the processing of sensor signals in a digital electronic system including a microprocessor, in which computed magnitudes are derived from the signals emitted by the sensors, and wherein the magnitudes are compared with one another to recognize certain travel situations. In order to carry out these comparisons simply and reliably using an economical microprocessor and cost-efficient sensors while applying simple computing steps, the comparison of two magnitudes derived from the sensor signals is carried out first on a level of the representation of one magnitude, for example, an angular yawing speed, and a second time on a level of the representation of the other magnitude, such as, for example, a steering angle. By this method, one comparison result supports the other. The method is advantageously used in a vehicle with a device for the control of travel stability, and preferably for the recognition of reverse travel.

14 Claims, 1 Drawing Sheet

FOREIGN PATENT DOCUMENTS

| | | | |
|---|---|---|---|
| 196 21 320 A1 | 12/1997 | (DE) | . |
| 196 22 462 A1 | 12/1997 | (DE) | . |
| 197 21 299 A1 | 12/1997 | (DE) | . |
| 197 36 199 A1 | 2/1998 | (DE) | . |
| 1-271621 * | 10/1989 | (JP) | . |

* cited by examiner

METHOD FOR DETERMINING A REFERENCE MAGNITUDE

BACKGROUND OF THE INVENTION

The present invention relates to a method for determining a reference magnitude, and more particularly, a reference magnitude which indicates the state of a vehicle traveling in reverse and which is determined based on a comparison of at least two measured variable magnitudes.

A method of this type, referred to generally as "situation recognition," is disclosed, for example, in German patent document DE 195 15 051 A1 (U.S. Pat. No. 5,774,821). In accordance with the known method, such situation recognition permits the distinguishing of various travel states, for example, straight forward travel, turning, reverse travel and stopping of a vehicle. Such distinction is required in applications involving a situation-dependent determination of control algorithms for a system which regulates vehicle stability.

The situation recognition method disclosed in the above referred patent document determines the state of reverse travel as a reference magnitude by comparing, for example, the angular yawing speed measured by a sensor with an angular yawing speed calculated from a steering angle measured by another sensor. When the measured angular yawing speed and the calculated angular yawing speed have different signs, and when the derivatives of these magnitudes with respect to time also have different signs, the state of reverse travel is recognized.

In order to convert the magnitudes measured by the sensors in the above example into a usable reference magnitude, several computing steps are necessary. In particular, the known method requires a conversion of the measured steering angle into an angular yawing speed, followed by a differentiation of measured and calculated angular yawing speed with respect to time. In order to ensure reliable recognition of reverse travel and/or good reproducibility of the comparison results, these computing steps, which are normally carried out by a microprocessor, must be carried out with a high degree of computing precision. In addition, a high degree of signal resolution is generally required, i.e., requiring small quantized steps from the sensors and from any downstream analog/digital converters which may be present.

Execution of the computing steps with the required level of computing precision, for example, by implementation of floating-point arithmetic, requires a microprocessor providing high computing capability, or may further require an additional floating-point processor, resulting in increased cost. High-resolution sensors and analog/digital converters are also expensive.

The utilization of simpler calculation methods for implementing the known method, such as integer arithmetic in which the computing steps involve only integer magnitudes, and which would otherwise be desirable because of a lower computing capability requirement, would however lead to computing errors, for example, when the remainder in a division of two magnitudes into each other is simply ignored. Particularly where several computing steps of this kind are used, such computing errors, which would then occur in a cumulative manner, would lead to unsatisfactory results in the determination of a reference magnitude, for example, one indicative of reverse travel.

It is therefore the object of the present invention to provide a method for the determination of a reference magnitude based on a comparison of at least two variable magnitudes, and in which the reference magnitude can be determined with relative reliability using simple computing steps and which may be implemented with inexpensive circuitry.

SUMMARY OF THE INVENTION

In accordance with these and other objects of the invention, there is provided a method for determining a reference magnitude by comparison of at least two variable magnitudes. A first variable magnitude with a first representation and a second variable magnitude with a second representation are obtained. A relationship exists between the first and second representations of the first and second variable magnitudes, permitting conversion thereof one to the other. The first and the second variable magnitudes are then compared with one another in a first comparison criterion on the level of the first representation. Subsequently, the first and the second variable magnitudes are again compared with one another in a second comparison criterion on the level of the second representation, thereby providing support for the first comparison result.

Hereinafter, a "comparison criterion" is understood to be a simple identity or similarity comparison between two magnitudes, as well as utilization of several individual criteria in a comparison process, as described in the example which follows.

The invention provides the advantage that by using simple sensing means, conversion means and computing means, and only slightly greater computing effort, i.e., by twice comparing the same magnitudes, once in the representation of the first magnitude and a second time in the representation of the second magnitude while using, for example, integer arithmetic, it is possible to achieve a significant improvement in the comparison results. In addition, by using a second comparison criterion for the second comparison, certain fixed magnitudes inherent to the comparison criterion, such as recognition thresholds, can be determined independently on the level of the second representation, thereby providing further advantage. It is also possible to convert the thresholds used with the first comparison criterion in the first representation simply by using the same rules which serve to convert the variable magnitudes, or the magnitudes measured by the sensors, into the second representation. Alternatively, however, the thresholds for the second comparison criterion can be set separately on a case by case basis. The method according to the invention can thereby be readily adapted to the most different of applications and can thus be used in an extremely flexible manner.

In an advantageous further development of the invention, the method for the recognition of reverse travel is used in a vehicle. In this regard, sensors are provided on the vehicle for the sensing of an angular yawing speed, a steering angle and a longitudinal vehicle speed. The additional or alternative utilization of sensors for transversal acceleration of the vehicle and for sensing the wheel speeds of individual wheels is also deemed advantageous.

To recognize reverse travel, the effect in the state of the art method mentioned above is used, in accordance with which the angular yawing speed obtained from the signal of the angular yawing speed sensor changes its sign between forward and reverse travel, while the normally used sensors for the determination of the longitudinal vehicle speed always reflects the actual vehicle speed in forward as well as in reverse travel. As a result, the angular yawing speed measured from the steering angle and the longitudinal vehicle speed by definition corresponds to the measured angular yawing speed, insofar as no unstable travel conditions exist, while conversely, in reverse travel, the calculated angular yawing speed evolves as an exact mirror image of the measured angular yawing speed.

In order to recognize the behavior described above, the state of the art method mentioned above proposes, inter alia, a differentiation between the magnitudes to be compared. In practice, in particular where microprocessor-controlled devices are used, this creates significant difficulties due to the potential quantizing errors noted earlier herein, because a differentiation in such time-discrete as well as value-discrete systems is effected by difference quotients. A highly precise calculation of such difference quotients requires costly computing and storage capabilities, and is advantageously avoided.

In an advantageous further development of the invention, the disadvantages resulting from the differentiation of the signals are avoided by using other comparison criteria which use only the non-differentiated signals as input magnitudes. Thus, a verification is first made in the first comparison criterion, i.e., on the level of the first representation, whether the measured angular yawing speed and the angular yawing speed calculated from the steering angle and the longitudinal vehicle speed have different sign and whether the difference between the measured and the calculated angular yawing speed reaches a minimum value, and whether the sum of these magnitudes is in amount lower than a maximum value. In the second comparison criterion and on the level of the second representation, i.e., in the form of a steering angle, a verification is made whether the measured steering angle and the steering angle calculated from the measured angular yawing speed and the longitudinal vehicle speed have different signs and whether the difference between the measured steering angle and the calculated steering angle reaches a minimum value and whether the sum of these steering angles has an amount below a maximum value. Then, if all three conditions, i.e., sign difference, amount difference condition and amount sum condition have been met with at least one comparison criterion, a state of reverse travel of the vehicle is assumed.

The above, and other objects, features and advantages of the present invention will become apparent from the following description read in conjunction with the accompanying drawing.

DETAILED DESCRIPTION OF THE PREFERRED EMBODIMENT

Figure 1:
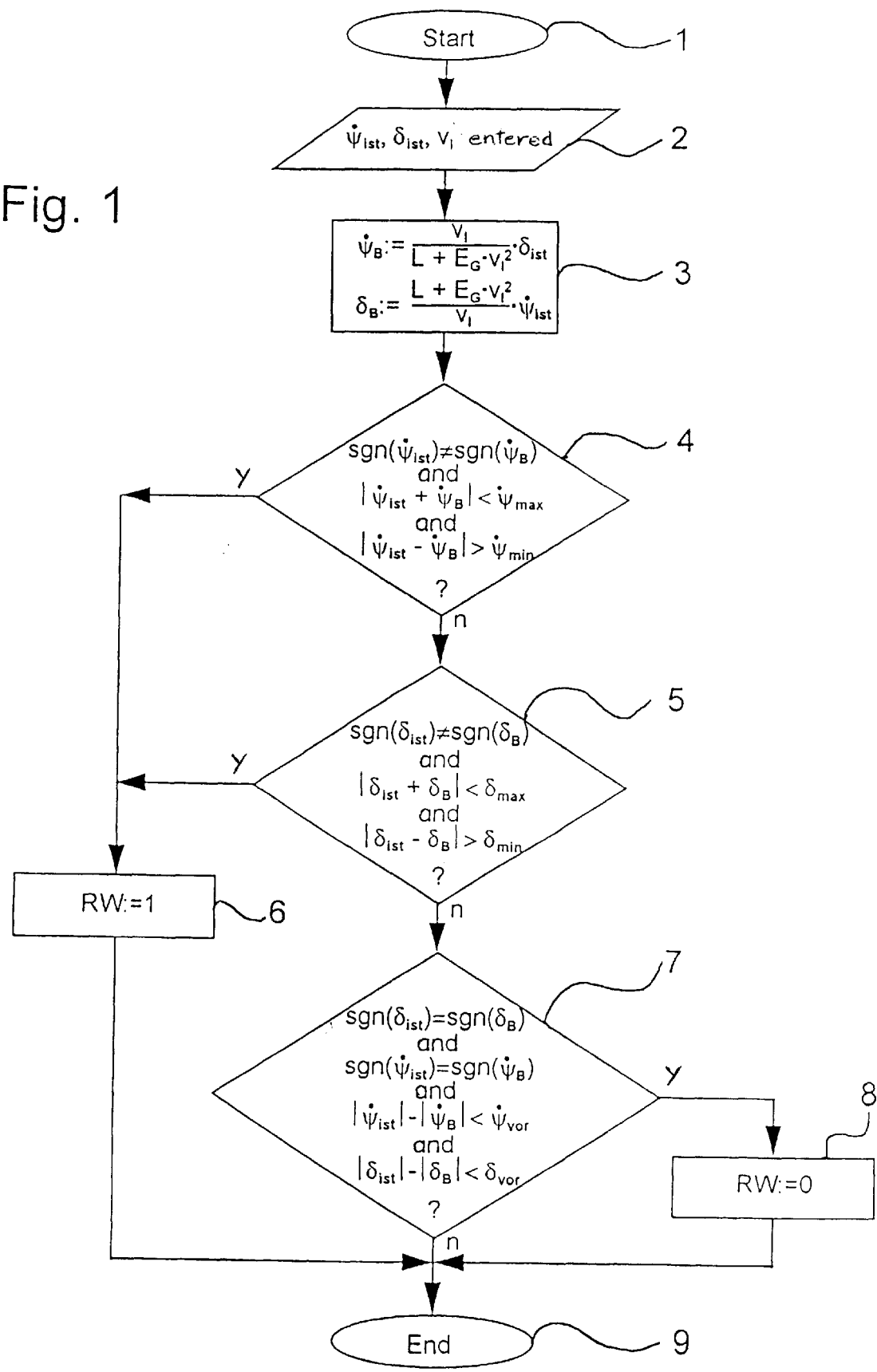
FIG. 1 is a schematic representation of the method according to the invention depicted in the form of a flow chart.

For purposes of disclosure, it is hereinafter assumed that the method described below is used in a vehicle having the following equipment:

At least one angular yawing speed sensor is provided for the measuring of the actual value of the angular yawing speed $\dot{\psi}_{ist}$ of the vehicle. For purposes herein, the angular yawing speed is understood to be the rotation of the vehicle around its vertical axis per time unit.

Furthermore, a steering angle sensor to measure the steering angle $\delta_{ist}$ set by the driver is provided. As used herein, the steering angle is understood not to be the steering wheel angle of rotation, but rather the angular deviation of steerable wheels from a direction parallel to the longitudinal vehicle axis.

In addition, a speed sensor is provided to determine the longitudinal vehicle speed $v_1$, i.e. the speed in direction of travel. It is also possible to determine the longitudinal vehicle speed $v_1$ as a reference speed through computation based upon the signals of wheel speed sensors, such as is commonly practiced, for example, in connection with ABS systems. A corresponding process is described, for example, in German patent DE 40 16 668 C2 (U.S. Pat. No. 5,082,333) and which is incorporated herein by reference.

Furthermore, a transversal acceleration sensor can be used to determine the transversal acceleration of the vehicle.

The vehicle is preferably also equipped with a braking system with a wheel brake assigned to each wheel and with an electronic control device which serves to process the sensor signals and which produces, by means of control algorithms, triggering signals for the wheel brakes to avoid undesirable travel states such as understeering, oversteering or skidding. Such a vehicle is referred to as a travel stability controlled vehicle. In addition to the concept of travel stability control, other concepts have also heretofore been accepted for use in vehicles, such as, for example, travel dynamic control, electronic stability control, cornering brake control, etc. The present invention is advantageously adapted to use with such systems.

With such systems for the control of travel stability it is necessary, because of the operational parameters of the vehicle, to distinguish between certain travel states, in particular forward and reverse travel, in the application of control algorithms. The vehicle behavior for that of a typical utility vehicle with steered front axle and driven rear axle, for example, is very different in forward as compared with reverse travel due to the functions assigned to the axles. The utilization of the control algorithms optimized for forward travel would lead to increasingly difficult control of the vehicle and an unstable travel state without special measures being taken in reverse travel. By virtue of the method steps described below, distinguishing between forward and reverse travel, and thereby an application of control algorithms optimized for the current driving state, is made possible.

Referring now to FIG. 1, the method depicted therein starts with a block 1. The magnitudes of angular yawing speed $\dot{\psi}_{ist}$, steering angle $\delta_{ist}$ and longitudinal vehicle speed $v_1$ determined by the above-described sensors are entered in a subsequent data transfer block 2.

Three magnitudes with three different physical representations, i.e. angular yawing speed, steering angle and longitudinal speed are thus available. To recognize reverse travel, the magnitudes of angular yawing speed $\dot{\psi}_{ist}$ and steering angle $\delta_{ist}$ are to be compared with each other to recognize reverse travel on the basis of the already described effect. For a comparison of these magnitudes, a conversion of each magnitude into a representation of the other magnitude is necessary.

This conversion can be carried out according to the following physical equation:

$$\dot{\psi} = \frac{v_1}{L + E_G * v_1^2} * \delta \quad [1]$$

where L and $E_G$ are magnitudes depending on the vehicle geometry, wherein L indicates the wheelbase and $E_G$ the steering properties. The self-guidance gradient $E_G$ is a vehicle constant for the travel situation under consideration, and is determined for a two-axle vehicle according to the following equation:

$$E_G = \frac{m_{Fzg} * (C_h * L_h - C_v * L_v)}{L * C_v * C_h} \quad [2]$$

In this equation $m_{Fzg}$ is the vehicle mass, $L_h$ the distance between the rear axle and the center of gravity of the vehicle, $L_v$ the distance between the front axle and the center of gravity of the vehicle, and $C_v$ the cornering stiffness of the rear axle. These magnitudes must be determined by tests and are vehicle-specific. For further definition of the above-mentioned magnitudes, refer to German Standard DIN 77000 of January 1994, incorporated herein by reference.

A computed angular yawing speed $\dot{\psi}_B$ is then synthesized from the measured steering angle $\delta_{ist}$ in an allocation block 3 using equation [1]. In addition, a computed steering angle $\delta_B$ is similarly determined from the measured angular yawing speed $\dot{\psi}_{ist}$, also by using the relationship according to equation [1].

In a decision block 4 following allocation block 3, the measured magnitudes $\dot{\psi}_{ist}$, $\delta_{ist}$ are compared with each other on the level of the representation of the angular yawing speed in a comparison criterion comprising three testing steps. In a first testing step, a test is made to ascertain whether the measured angular yawing speed $\dot{\psi}_{ist}$ and the computed angular yawing speed $\dot{\psi}_B$ have different signs ($sgn(\dot{\psi}_{ist}) \ne sgn(\dot{\psi}_B)$). In a second testing step a verification is made to ascertain whether the sum of the above-mentioned angular yawing speeds $\dot{\psi}_{ist}$, $\dot{\psi}_B$ is an amount lower than a maximum value $\dot{\psi}_{max}$ ($|\dot{\psi}_{ist}+\dot{\psi}_B|<\dot{\psi}_{max}$). In a third testing step a test is made to ascertain whether the difference between the angular yawing speeds $\dot{\psi}_{ist}$, $\dot{\psi}_B$ exceeds a minimum value $\dot{\psi}_{min}$ ($|\dot{\psi}_{ist}-\dot{\psi}_B|>\dot{\psi}_{min}$). Only when it has ascertained in each of the three testing steps that the respective condition has been met does the program go on to a processing block 6. If a condition is not met in one of the testing steps, the program continues with a decision block 5.

In the decision block 5, the second comparison criterion consisting of three testing steps is carried out in a manner analogous with decision block 4. In the decision block 5, the measured magnitudes $\dot{\psi}_{ist}$, $\delta_{ist}$ are compared with each other on the level of the representation of the steering angle. The testing steps described earlier for the decision block 4 are carried out in a similar manner, i.e. by using the measured steering angle $\delta_{ist}$ and the computed steering angle $\delta_B$, as well as maximum or minimum values $\delta_{max}$, $\delta_{min}$ adapted to the second comparison criterion. When all the conditions in the different testing steps are met ($sgn(\delta_{ist}) \ne sgn(\delta_B)$, $|\delta_{ist}+\delta_B|<\delta_{max}$, and $|\delta_{ist}-\delta_B|>\delta_{min}$), the program also branches off from the decision block 5 to the processing block 6. Otherwise the program continues with an additional decision block 7.

In the processing block 6, a magnitude RW which represents the reference magnitude determined by the method according to the invention is set to value 1 indicating that the vehicle is traveling in reverse.

In the decision block 7, the resetting conditions for the magnitude RW are checked in four testing steps. When all the conditions indicated in these testing steps are met, the vehicle is not travelling in reverse, i.e. the vehicle is standing still or is travelling in a forward direction. In the first testing step of the decision block 7, a verification is made at the level of the representation of the steering angle whether the magnitudes $\delta_{ist}$, $\dot{\psi}_{ist}$ used have the same signs ($sgn(\delta_{ist})=sgn(\delta_B)$). In the second testing step a verification is made at the level of the representation of the angular yawing speed to support the previous testing step ($sgn(\dot{\psi}_{ist})=sgn(\dot{\psi}_B)$). In the third and fourth testing steps, again at the level of the representation of the angular yawing speed and then at the level of the representation of the steering angle, respectively, a verification is made to ascertain whether the amounts of the magnitudes $\dot{\psi}_{ist}$, $\delta_{ist}$ used differ from each other by less than a predefined magnitude $\dot{\psi}_{vor}$, $\delta_{vor}$ ($||\dot{\psi}_{ist}|-|\dot{\psi}_B||<\dot{\psi}_{vor}$, $||\delta_{ist}|-|\delta_B||<\delta_{vor}$). When all of these conditions are met, the program branches off to a processing block 8, wherein the magnitude RW is set to a value of zero.

The process then ends in block 9.

During actual operation of a vehicle, the conditions used in the decision blocks 4, 5, 7 are not always met, i.e. travel situations exist in which these conditions do not provide any indication of the direction of travel, for example, in the case of a slipping vehicle. In such cases, the last recognized value of the magnitude RW is retained until a clear recognition of the direction of travel is again possible. As long as no clear recognition is possible, only the blocks 1, 2, 3, 4, 5, 7, 9 are taken into consideration.

It is noted, that a transversal acceleration $a_q$ can be used instead of a steering angle $\delta_{ist}$ for the process steps described above, as permitted by the available sensor equipment of the vehicle. The conversion of a transversal acceleration into an angular yawing speed can be made in accordance with the following equation:

$$\dot{\psi} = a_q/V_1 \quad [3]$$

A conversion into a steering angle is also possible according to equation [1].

If sensors are available for the steering angle as well as for the transversal acceleration, it is then advantageous to use the magnitudes measured by the sensors $\delta_{ist}$, $a_{q,ist}$ to find the reference magnitude RW according to the invention. To support the comparison results, it is thus advantageous in the first comparison criterion according to the decision block 4 to carry out the testing steps effected therein a second time, this time using the angular yawing speed $\dot{\psi}_{B2}$, where $\dot{\psi}_{B2}=a_{q,ist}/V_1$, calculated from the transversal acceleration instead of the angular yawing speed $\dot{\psi}_B$ calculated from the steering angle, i.e. with the additional testing steps $sgn(\dot{\psi}_{ist}) \ne sgn(\dot{\psi}_{B2})$, $|\dot{\psi}_{ist}+\dot{\psi}_B|<\dot{\psi}_{max}$, $|\dot{\psi}_{ist}-\dot{\psi}_{B2}|>\dot{\psi}_{min}$, and to logically link together all six testing steps, preferably in the form of an AND linkage.

It is also advantageous, in a third comparison criterion, to carry out the comparison according to the decision block 4 in the representation of the transversal acceleration type in an analog fashion, i.e. to use the three testing steps according to the decision block 4 on the measured transversal acceleration and a transversal acceleration calculated from the measured angular yawing speed.

For this, appropriate maximum or minimum values $a_{max}$, $a_{min}$ must then be set. For the third comparison criterion, the process according to FIG. 1 must then be expanded to include a decision block 5a (not depicted) which is located between the decision blocks 5, 7 and which branches off to the processing block 6 in the event of a positive comparison result.

The testing steps in the decision block 5a are then: $sgn(a_{q,ist}) \ne sgn(a_{q,B})$, $|a_{q,ist}+a_{q,B}|<a_{max}$, and $|a_{q,ist}-a_{q,B}|>a_{min}$. By using the equation [3], $a_{q,B}$ is determined as $a_{q,B}=\dot{\psi}_{ist}*V_1$.

The starting magnitude of the process, i.e. the magnitude RW, can be used in additional control and steering processes, e.g. for the application of special control algorithms for forward travel and reverse travel. It is also possible to use the magnitude RW to trigger indication elements such as for example a rear light for reverse travel.

The recognition thresholds $\dot{\psi}_{min}$, $\dot{\psi}_{max}$, $\dot{\psi}_{vor}$, $\delta_{min}$, $\delta_{max}$, $\delta_{vor}$, $a_{min}$, $a_{max}$ used in the comparison criteria or the testing steps must be determined empirically for the applicable vehicle model. A list of value combinations which are suitable for a two-axle vehicle of conventional design is indicated below:

$\dot{\psi}_{min}$: 2°/s  $\dot{\psi}_{max}$: 2°/s  $\dot{\psi}_{vor}$: 1°/s
$\delta_{min}$: 15°  $\delta_{max}$: 15°  $\delta_{vor}$: 10°
$a_{min}$: 1.5 m/s$^2$  $a_{max}$: 1.5 m/s$^2$ Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method for determining a reference magnitude, comprising:

obtaining a first variable magnitude with a first representation;

obtaining a second variable magnitude with a second representation, a relationship existing between the first and second representations to permit conversion thereof one to another;

comparing the first and the second variable magnitudes with each other in a first comparison criterion on the level of the first representation;

comparing the first and the second variable magnitudes with each other in a second comparison on the level of the second representation to support the first comparison result; and based on said comparisons, determining said reference magnitude.

2. The method according to claim 1, wherein results of the first and the second comparison criterion are logically linked to each other.

3. The method according to claim 2, wherein the logical linking is an AND linkage.

4. The method according to claim 1, wherein the relationship existing between the representations of the first and of the second variable magnitude comprises another variable magnitude.

5. The method according to claim 1, wherein at least one of the first, the second and any additional variable magnitudes are obtained from signals emitted by sensors.

6. The method according to claim 1, wherein sensors are provided for sensing said variable magnitudes and said variable magnitudes are selected from the group consisting of a longitudinal vehicle speed, a steering angle, a transversal acceleration, an angular yawing speed and a wheel speed.

7. The method according to claim 6, wherein:

a result from said steps of comparing indicates a state of reverse travel of a vehicle;

the first variable magnitude is an angular yawing speed and the second variable magnitude is a steering angle;

the first and second comparison criterion each includes carrying out separate tests to ascertain conditions as to whether the magnitudes have different signs on a respective representation level, whether a difference between the magnitudes exceeds a minimum value, and whether a sum of the magnitudes is lower than a maximum value; and when all of said conditions have been met for at least one comparison criterion, the state of reverse travel of the vehicle is assumed.

8. The method according to claim 1, wherein the first variable magnitude is an angular yawing speed and the second variable magnitude is a steering angle.

9. A method for determining a reference magnitude for situation recognition in a vehicle, comprising:

obtaining a measured value of a first travel parameter having a first variable magnitude;

obtaining a measured value of a second travel parameter having a second variable magnitude, a relationship existing between said first and second travel parameters;

converting said measured value of said first travel parameter into a computed value of said second travel parameter and said measured value of said second travel parameter into a computed value of said first travel parameter;

comparing the measured and computed values of said first travel parameter with one another in accordance with a first comparison criterion; and comparing the measured and computed values of said second travel parameter with one another in accordance with a second comparison criterion; and setting a value of the reference magnitude indicative of a travel state dependent upon an outcome of at least one of said steps of comparing.

10. The method according to claim 9, wherein results of the first and the second steps of comparing are logically linked to each other.

11. The method according to claim 10, wherein the logical linking is an AND linkage.

12. The method according to claim 9, wherein the first and the second travel parameters are related to each other as a function of a third travel parameter.

13. The method according to claim 12, wherein the first travel parameter is an angular yawing speed, the second travel parameter is a steering angle and the third travel parameter is a longitudinal vehicle speed.

14. The method according to claim 9, wherein:

the first travel parameter is an angular yawing speed and the second travel parameter is a steering angle;

the first and second comparison criteria each includes carrying out sequential tests to ascertain conditions as to whether the measured and the calculated values for the first travel parameter and the measured and calculated values for the second travel parameter, respectively, have different signs, whether a difference between measured and calculated values exceeds a minimum value, and whether a sum of the measured and calculated values is lower than a maximum value; and when all of said conditions have been met for at least one of said first and second comparison criteria, the reference magnitude is set to a value indicative of reverse travel of the vehicle.

* * * * *